United States Patent

[11] 3,573,745

[72] Inventor Carl J. May, Jr.
Holmdel, N.J.
[21] Appl. No. 781,145
[22] Filed Dec. 4, 1968
[45] Patented Apr. 6, 1971
[73] Assignee Bell Telephone Laboratories Incorporated
Murray Hill, Berkeley Heights, N.J.

[54] GROUP QUEUING
13 Claims, 7 Drawing Figs.

[52] U.S. Cl. .......... 340/172.5
[51] Int. Cl. .......... G06f 7/00
[50] Field of Search .......... 340/172.5; 235/157

[56] References Cited

UNITED STATES PATENTS

| | | | |
|---|---|---|---|
| 3,273,131 | 9/1966 | Strohm | 340/172.5 |
| 3,300,763 | 1/1967 | Hoehmann | 340/172.5 |
| 3,307,150 | 2/1967 | Bartlett | 340/172.5 |
| 3,328,772 | 6/1967 | Oeters | 340/172.5 |
| 3,390,380 | 6/1968 | Cooke-Yarborough | 340/172.5 |
| 3,401,376 | 9/1968 | Barnes | 340/172.5 |
| 3,422,401 | 1/1969 | Lucking | 340/172.5 |
| 3,437,998 | 4/1969 | Bennett | 340/172.5 |
| 3,449,722 | 6/1969 | Tucker | 340/172.5 |
| 3,487,375 | 12/1969 | Macon | 340/172.5 |

*Primary Examiner*—Paul J. Henon
*Assistant Examiner*—R. F. Chapuran
*Attorneys*—R. J. Guenther and R. B. Ardis

ABSTRACT: Queuing circuitry that utilizes two variable length queues is disclosed. Input signals exceeding a system's capacity are queued in queue Q1 while inputs in queue Q2 are served by the system. When all of the inputs in queue Q2 have been served, the inputs in queue Q1 are transferred to queue Q2 where they are served while a new queue is formed in queue Q1. The length of the queues vary as a function of the input overload and the maximum length of either queue equals the maximum number of inputs that may be applied to the system.

INVENTOR
C. J. MAY, JR.
BY Norman D. McClaskey
ATTORNEY

| QUEUE | MNEMONIC | CODE |
|---|---|---|
| CONNECT QUEUE Q1 | (SCQ1) | 001 |
| CONNECT QUEUE Q2 | (SCQ2) | 011 |
| DISCONNECT QUEUE Q1 | (SDQ1) | 010 |
| DISCONNECT QUEUE Q2 | (SDQ2) | 100 |
| DISCONNECT STATUS | SDC | 101 |
| SERVE STATUS | SSC | 000 |

FIG. 4

| LINE ADDRESS | CODE |
|---|---|
| M 1 | 001 |
| M 2 | 011 |
| M 3 | 011 |
| M 4 | 101 |
| M 5 | 010 |
| M 6 | 100 |
| | |
| Mn | 000 |

FIG. 5

| LINE ADDRESS | CODE |
|---|---|
| M 1 | 011 |
| M 2 | 101 |
| M 3 | 000 |
| M 4 | 001 |
| M 5 | 100 |
| M 6 | 101 |
| | |
| Mn | 010 |

GROUP QUEUING

BACKGROUND OF THE INVENTION

1. Field of the Invention

This invention relates to queuing and more particularly to multiple queues in real time systems.

2. Description of the Prior Art

The prior art shows numerous systems that require temporary input buffering or queuing to avoid losing input signals under a peak input load. Two widely known types of such systems are date processing systems and switching systems. Prior art queuing is accomplished by using a single queue of finite length. When an input arrives that cannot be immediately processed by the associated system, an entry identifying the input is placed in the queue. At some later time, when the system can process another input, entries in the queue are used to determine the input to be processed.

When the number of inputs arriving during the time the system is unable to process additional inputs exceeds the number of places in the queue, the inputs arriving after the queue is filled are lost. In other words, once the queue is filled with input identifiers, the arrival of additional inputs is not recorded. As a consequence, those inputs arriving after the queue is filled are not processed when the system is able to process additional inputs since there is nothing in the system indicating their arrival. Such a queue may be succinctly described as a finite queue which loses inputs in excess of its capacity.

While the prior art queue performs satisfactorily in a system whose maximum backlog of inputs is small, it is not satisfactory in a system where large input backlogs may be encountered. In order to avoid input loss, the queue must be of the same length as the number of possible inputs. Processing and updating entries in such a queue, where the number of entries is large, is very time consuming. Consequently, inputs with entries in the queue may be lost as a result of tardy service when there is a high input backlog.

SUMMARY OF THE INVENTION

Applicant's invention avoids the problem of input loss by providing a queue of essentially infinite length that can be processed and updated with sufficient rapidity to provide adequate service for large input backlogs. Applicant accomplishes queuing by utilizing a plurality of variable length queues to queue input signals. While the following discussion is in terms of only two queues, it is obvious that $n$ queues may be used. It is equally as obvious that the input identifiers in a queue may be the actual input data. The two queue example is used to facilitate a clear concise description of the invention without the redundancy inherent in describing an $n$ queue system.

At a selected time, the system input lines are scanned to determine which of the lines requires service. The line addresses of the lines requiring service which cannot be served by the system during this scan are stored in queue Q2. As the system has time to process new inputs, it begins to process the lines requiring service by randomly picking line addresses from queue Q2. While the system is serving queue Q2, another scan of the input lines is made and the lines requiring service, whose addresses are not already in queue Q2, have their addresses written in queue Q1. One of two approaches may be used when queue Q2 is empty. The first is to begin serving queue Q1 while a new queue is formed in the empty queue Q2. The second is to transfer the addresses in queue Q1 to queue Q2 and begin a new queue in queue Q1. In other words, either queue Q2 is always the served queue or the served queue alternates between queue Q1 and queue Q2.

The foregoing is succinctly described as group queuing. The set of line addresses stored in queue Q2 on the first scan represents the first group of lines to be served while the addresses stored in queue Q1 on the second scan represents group two. An essentially infinite queue may be obtained by providing enough storage to store all the input line addresses simultaneously. This storage is then partitioned into a plurality of smaller queues of variable length which constitute the infinite queue.

It is an object of this invention to provide a practical infinite queue.

It is another object of this invention to reduce the loss of input signals in real time data processing systems, or switching systems, under conditions of extreme loading.

It is a more specific object of the invention to increase the efficiency of a time assignment speech interpolation (TASI) system by reducing the number of active talker lines lost under high traffic conditions.

It is a still more specific object of this invention to combine a plurality of variable length queues in such a way that they operate as a single infinite queue.

Some of the more obvious advantages of the invention are as follows. Only a relatively small amount of storage is required to obtain an infinite queue. Additionally, by partitioning the required storage into separate variable length queues and adopting the group queuing technique, it is possible to realize an infinite length queue whose entries may be processed and updated within practical time limits. One further advantage is the fact that the effectiveness of applicant's group queue does not deteriorate when used in systems that experience substantial fluctuations in input loads.

BRIEF DESCRIPTION OF THE DRAWINGS

FIG. 2 is a detailed block diagram of circuitry implementing the invention.

FIGS. 3 through 5 are useful in the detailed description of the invention.

The numerous features, objects and advantages of the invention will become apparent upon considering the FIGS. in conjunction with the following description of the invention.

GENERAL DESCRIPTION

For illustrative purposes the invention may be thought of as a part of a TASI system (time assignment speech interpolation system). As is well known, a TASI system is a subsystem within a switching system that identifies the input lines requiring service.

Figure 1A:
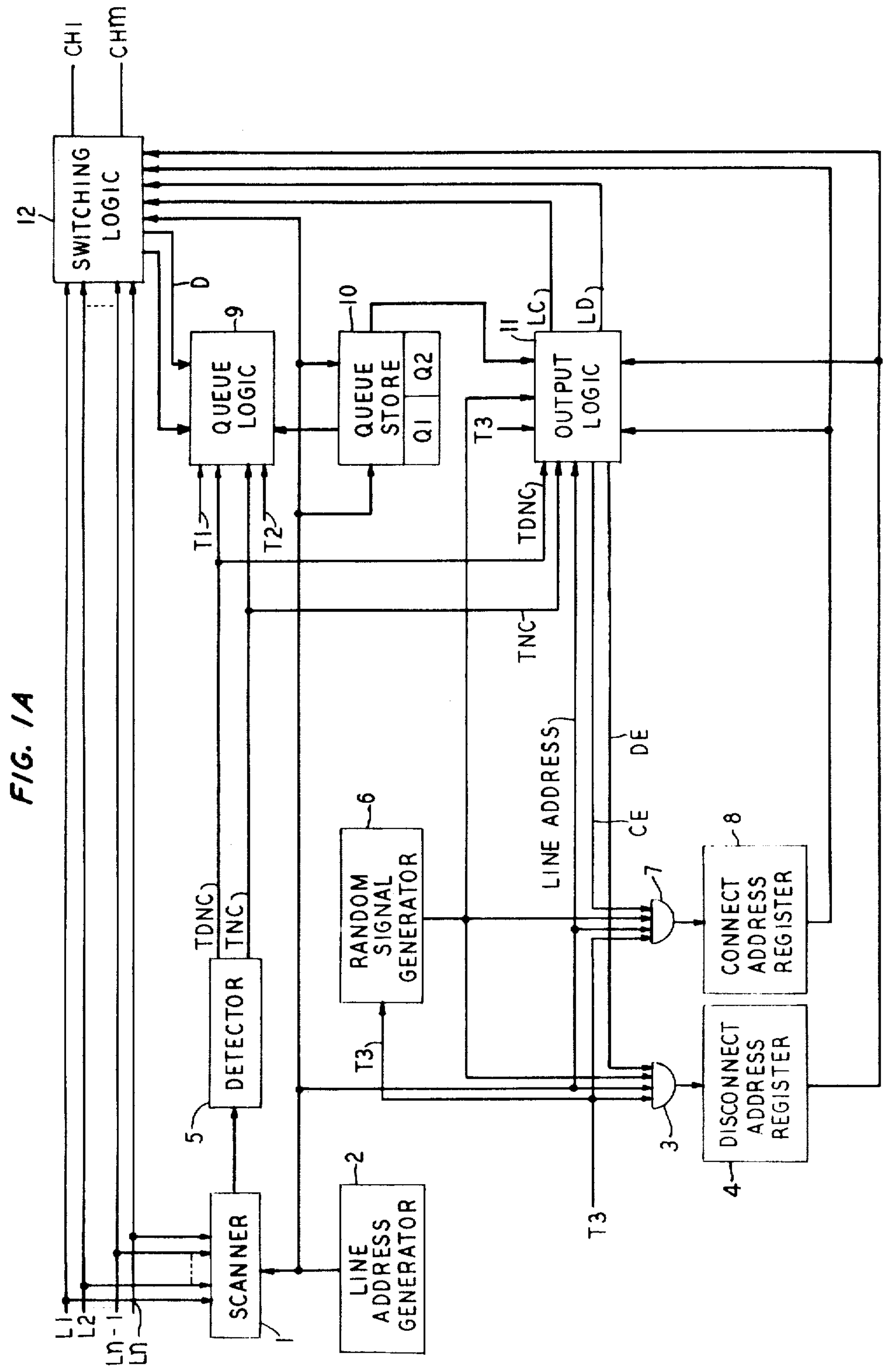
FIG. 1A is a functional block diagram of a representative system utilizing applicant's group queuing.

FIG. 1A shows a representative system incorporating applicant's queuing circuitry. The lines L1 through L$n$ are scanned repetitively at a selected rate by the scanner 1. The detector 5 utilizes the resulting samples to determine which of the lines require service. If a sampled line requires service, the detector 5 generates the signal TNC when that line is sampled. On the other hand, if a sampled line does not require service, the detector generates the signal TDNC when the line is sampled.

These signals are applied as inputs to queue logic 9. Additionally, the queue logic 9 has timing signals T1 and T2 and signals S and D from the switching logic 12 as input signals. The switching logic may be any switching apparatus capable of connecting a selected input line L$i$ to an output line CH$j$. The signals S and D generated by the switching logic indicate that the logic has connected or disconnected, respectively, a line that has been waiting in a queue.

Scanning of the lines L$i$ is controlled by a line address generator 2. The output of this address generator is also an input to the queue store 10. The address input to the queue store 10 makes the memory location of the queue associated with the line currently being sampled available to the queue logic 9.

For purposes of illustration, it will be assumed that the queue store 10 is subdivided into two queues. This may be accomplished by partitioning the storage locations in the queue store into two separate sets, or it may be done by using two sets of state codes to represent two queues. This will be discussed more specifically in the detailed discussion. It will be further assumed that the system input load is sufficient to require queuing unless otherwise stated.

Basically, each queuing operation consists of three phases involving three successive scans of the input lines. During the first scan of a queuing operation, the queues are updated and checked for entries. On the second scan, new entries are made in queues and a new queue of entries is selected to be served if the queue previously being served is empty. During the third and final scan of input lines, a selected number of lines in the served queue are randomly selected as candidates for service.

Periodically, after some number of input line scans, phase one of the queuing operation begins. This phase is initiated at the beginning of a scan of lines L1 through L*n* by the presence of the signal T1 at the input to the queue logic 9. As the scan progresses from L1 to L*n*, an output is generated for each line by the detector 5 and introduced into the queue logic 9. Simultaneously, the queue entry for that line is available from the queue store 10. The detector 5 output is combined with the queue entry of the line, regardless of the queue it is in, and this entry is updated.

During the updating scan, all queue entries for lines which no longer require service are removed from the queues. More specifically, if the sample of L*k* during time T1 results in the generation of a TDNC signal by the detector 5 (FIG. 1A) and the line's queue entry indicates that it had previously been waiting for service, this entry is changed. Since the TDNC signal indicates that line L*k* no longer requires service, its entry in the queue is changed to indicate this fact. Essentially, line L*k* is removed from the queue of lines waiting for service.

In addition to the foregoing updating which occurs during time T1, each queue is checked to see if it contains any entries. This is accomplished by checking each location in the queue store 10 for the various entries associated with each queue.

After completing the foregoing operations for all of the lines on the first scan of the queuing operation, the second phase is initiated by the occurrence of the timing signal T2. This timing signal occurs simultaneously with the start of the next scan of the lines L1 through L*n* (FIG. 1A).

During this second scan of the queuing operation, when T2 is present, two operations may occur. One of these operations is to make queue entries for lines that previously required no service. For instance, if the T2 sample of line L*k* results in the generation of the signal TNC (FIG. 1A), indicating the line requires a connection, and the line is not already waiting for service in a queue, the queue logic 9 puts the line in a queue in the queue store 10 (FIG. 1A).

The other operation takes place when the served queue is empty at the time the signal T2 occurs. Assuming that the queue Q2 is always the served queue and this queue was empty during the updating phase, the contents of queue Q1 are transferred to Q2. If queue Q2 is not empty no transfer will occur during phase two.

After the completion of the second scan in the queuing operation, timing signal T3 is generated and this initiates the third and final phase of the queuing operation. The signal T3 activates a random signal generator 6 (FIG. 1A) as the address generator generates the address of line L1. The input lines are scanned as indicated above. Each time the detector 5 output for a line is TNC and the line has an entry in Q2 indicating it needs service, a signal CE (FIG. 1A) is generated by the output logic 11. This signal results in the line's address being gated into the connect address register 8. Similarly, when the detector output for a line is TDNC and the line has a Q2 entry indicating it is waiting to be disconnected, a signal DE is generated by the output logic 11 (FIG. 1A). This line's address is read into the disconnect register 4. This scanning continues with the addresses in the registers 4 and 8 changing as different lines satisfy the necessary conditions.

At some random point within the phase three scan interval, the signal generator 6 (FIG. 1A) is disabled. This random signal is used to randomly service the entries in queue Q2. When this occurs, gates 3 and 7 are disabled and the current contents of address registers 4 and 8 cannot be changed. The disabling of the signal generator is also transmitted to the output logic 11. This disabling indicates that the addresses of the lines to be connected and disconnected, if such operations are possible, are in the address registers 4 and 8 unless these registers contained no addresses when the signal generator was disabled.

If both registers contain addresses, the output logic generates signals LC and LD which are inputs to the switching logic 12 (FIG. 1A). When these signals are present and the switching logic can perform either operation, it will perform the operations for the lines whose addresses are in the register. On the other hand, if one or both of the address registers contain no addresses, the signals LC and LD are not generated. For this case the switching logic will connect or disconnect the next line that is sampled which generates a TNC or RDNC signal, respectively. In other words, an empty address register indicates to the switching logic that there are no queues of lines waiting to be connected or disconnected.

Figure 1B:
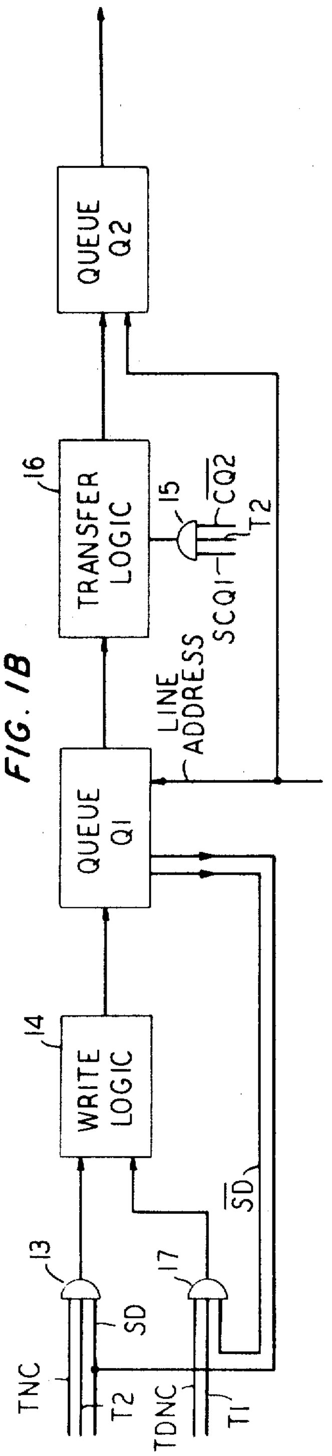
FIGS. 1B and 1C are useful in the general description of the concept embodied in the invention.

The foregoing has generally described the operation of an illustrative system utilizing applicant's queuing circuitry. The fundamental concepts involved in applicant's invention are most readily understood by referring to FIGS. 1B and 1C. Referring to FIG. 1B, an embodiment of the invention is shown in which queue Q2 is always the served queue. In other words, when the system is looking for inputs waiting to be processed, it always uses the entries in queue Q2. The queue Q1 is the queue in which new queues are formed when the system inputs are scanned. It will be assumed that queue Q1 contains the current queue entries for all input lines. Whenever all the inputs with entries in queue Q2 have been processed, the entries in queue Q1 are transferred into Q2 via the transfer logic 16 when the timing signal T2 becomes true. The input lines represented by these entries are processed by the system as time becomes available.

More specifically, assume that queue Q2 (FIG. 1B) is empty and queue Q1 contains entries during the update phase when T1 is true. The existence of these conditions results in the generation of the signals SCQ1 and $\overline{CQ2}$ which indicate that queue Q1 contains entries and queue Q2 is empty, respectively.

When these signals are present during phase two, the condition $SCQ1 \cdot \overline{CQ2} \cdot T2$ will enable gate 15. The output of gate 15 enables the transfer logic 16 and this results in the queue Q1 entries being transferred to queue Q2.

Sometime after the foregoing, at the beginning of a scan of the inputs, the timing signal T1 will become a logical 1. This represents the update phase of a new queuing operation. The signal T1 will remain a 1 for the duration of the scan. As the system inputs are scanned, each input not requiring service results in the signal TDNC being generated. This signal and the signal T1 are applied to AND gate 17 (FIG. 1B). Simultaneously, with the sampling of the line that results in the signal TDNC being generated, the input line's address is applied to queue Q1 making the queue location associated with the line available. If this location contains an entry, the signal $\overline{SD}$ becomes a 1. When this occurs, all of the inputs to gate 17 are 1 and the gate is enabled. The write logic responds to an output from gate 17 by clearing the location associated with the input being sampled.

More concisely, the foregoing represents a case where an input line has been in queue Q1 in the past but no longer needs service. When this occurs, the input line's entry in the queue is erased since the line is no longer waiting for service. After all of the inputs have been scanned, and the queue Q1 entries of all those inputs no longer requiring service have been erased, T1 becomes a 0.

As will be recalled, each of the queues is checked for entries when T1 is true. Since the transfer from queue Q1 to queue Q2 has already been explained, it will be assumed that queue Q2 contains entries during this queuing operation. Thus, $\overline{CQ2}$ (FIG. 1B) will not be generated during the update phase of the queuing operation.

At the time T1 becomes a 0, a new scan of the system inputs begins. Simultaneously, the timing signal T2 (FIG. 1B) becomes a 1. This condition represents phase two of the queuing operation. The signal T2 will remain true for one complete scan. No queue Q1 to queue Q2 transfer will occur at this time since the signal $\overline{CQ2}$ is not present due to the presence of entries in queue Q2. However, as each input line is encountered, its address is again supplied to queue Q1 (FIG. 1B). If the input line requires service the detector 5 (FIG. 1A) generates a signal TNC that is applied as an input to gate 13 (FIG. 1B). Additionally, the application of the line's address to queue Q1 results in the contents in queue Q1 associated with the input line being available. If the contents of this location indicate that there is no existing queue entry for the input, the signal SD is generated.

The simultaneous existence of the signals T2, SD and TNC enables gate 13 (FIG. 1B). The write logic 14 responds to the output of gate 13 and an entry is written into the queue location in queue Q1 associated with the sampled input line. In essence, this operation puts the sampled line in queue Q1 since it requires service and is not already in a queue. If the sampled input had not required service, the signal TNC would not have been generated and no entry would have been written into the queue location associated with the input.

The foregoing process is repeated for each of the other inputs. After the last input has been sampled, the signal T2 becomes a 0 and remains this value for a selected interval. During this time, there are no inputs to queue Q1 and its entries remain unchanged. Meanwhile, inputs having entries in queue Q2 are being served by the system when possible. If queue Q2 is emptied between queuing operations, the contents of queue Q1 will be transferred to queue Q2 during phase two of the next queuing operation as described above. On the other hand, if the system is unable to serve all the inputs having entries in Q2 during this interval no queue Q1 to queue Q2 transfer occurs.

The interval between the occurrence of the timing signals T1 represents the time between queuing operations. Since applicant's invention may be used in various types of systems, the rate of occurrence of T1 will depend upon the operating characteristics of the particular system being used. In the illustrative example, the rate of occurrence of T1 is related to the maximum rate at which the switching logic 12 (FIG. 1A) can establish new connections or disconnections.

Figure 1C:
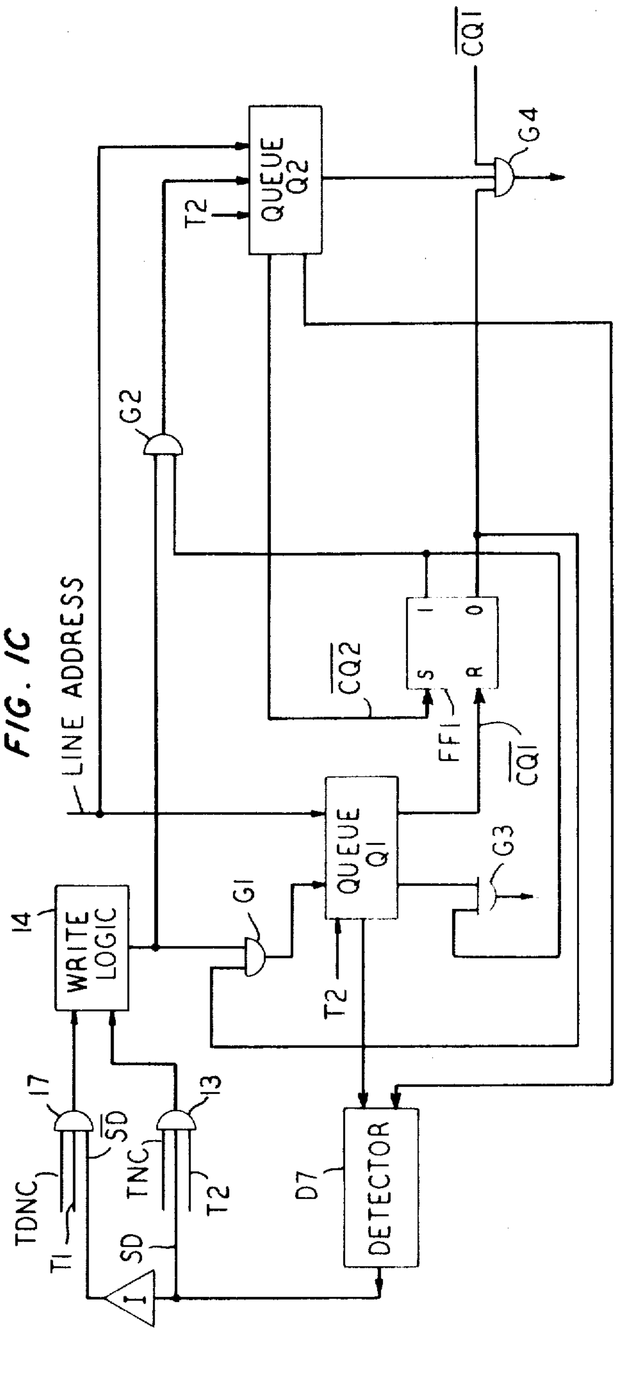

The operation of the queue in FIG. 1C is essentially the same as that of FIG. 1B except that queues Q1 and Q2 (FIG. 1C) are served alternately instead of queue Q2 always being served. The logic for enabling gates 13 and 17 remains the same. The difference lies in the addition of gates used to switch the output of the write logic 14, the gates used to switch queue outputs, and the detector D7 for detecting queue entries. For instance, assuming queue Q2 has entries in it and queue Q1 has been emptied sometime in the past, the operation is very similar to that described above. When the queue Q1 is empty during a queuing operation, the signal $\overline{CQ1}$ will be applied to the FF1 (FIG. 1C) at time T2 of the operation. The flip-flop FF1 will reset and gates G1 and G4 will be enabled. The detector D7 indicates whether or not a line is entered in a queue at the time of sampling. If the line has no entry in either queue, the detector D7 is enabled and SD is applied to gate 13. For this condition, new entries are written into queue Q1 for lines requiring service while queue Q2 is being served.

However, when queue Q2 is emptied, the signal $\overline{CQ2}$ (FIG. 1C) will occur at time T2 during the next queuing operation, setting flip-flop FF1. When flip-flop FF1 is set, gates G1 and G4 are disabled and gates G2 and G3 are enabled. For this condition, queue Q1 becomes the served queue while queue Q2 is used to store a new queue. The condition will continue to exist until queue Q1 has been emptied and the signal $\overline{CQ1}$ is generated. When $\overline{CQ1}$ is generated flip-flop FF1 is reset and queue Q2 becomes the served queue again.

While the foregoing discussion has treated the queues Q1 and Q2 as though they are physically distinct storage locations, this is not necessary. It was done only to facilitate an understanding of the fundamentals of the invention. The two queues may obviously be represented by two sets of state codes stored in a single physical storage means. In this case, entries in a queue are checked by checking for the presence of a selected code in each storage location in the storage means. The length of a queue varies as the number of storage locations containing the code representing the queue varies. Utilizing this approach allows the realization of an operational infinite queue and the maximum number of storage locations required equals the number of input lines. Such a queue is symbolically represented in FIGS. 4 and 5. The codes in these FIGS. are defined in the table shown in FIG. 3.

DETAILED DESCRIPTION

Figures 2, 3:
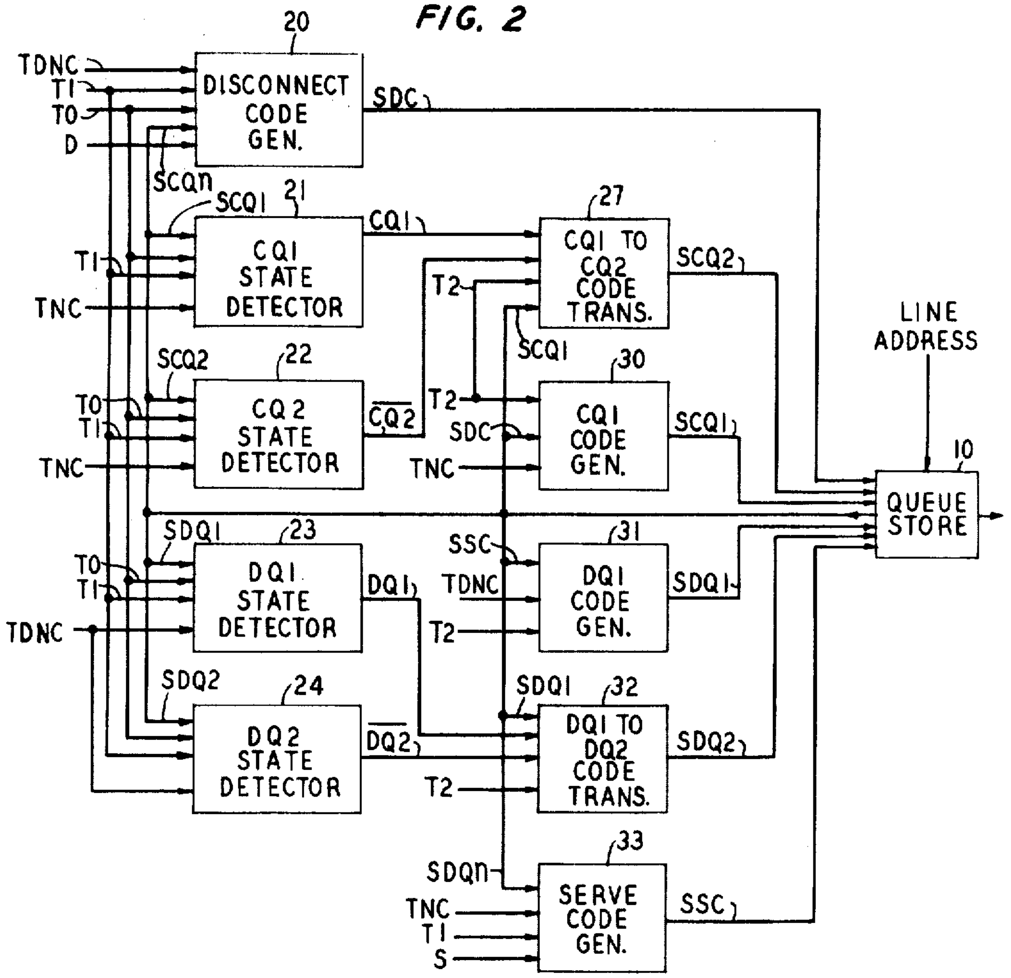

A detailed functional block diagram of one embodiment of applicant's invention is shown in FIG. 2. The circuitry shown here represents a queue which consists of two variable length queues identified by state codes rather than physically partitioned storage locations. Additionally, the circuit is designed so that queue Q2 is always served. The codes in FIG. 3 and the symbolic queue representations shown in FIGS. 4 and 5 will be used in describing the circuit operation in detail.

Referring to FIG. 3, six binary codes are shown, each of which is associated with a mnemonic and description. For instance, the first row of the table in FIG. 3 contains the code 001 which has a mnemonic SCQ1 associated with it and a description of connect queue Q1. In other words, the presence of code 001 in a location of the queue store 10 (FIG. 2) indicates that the line associated with this location is in a connect queue and more specifically, it is in connect queue Q1.

Similarly, connect queue Q2 code 011 (FIG. 3) indicates that a line is in connect queue Q2. The disconnect queue Q1 and disconnect queue Q2 associated with codes 010 and 100, respectively, indicate a line is in one of two disconnect queues. The disconnect queues are used to queue lines that have connections and no longer need them. Thus, when a plurality of such lines exists, they are queued until they can be disconnected. This avoids the possiblity of an idle line being needlessly connected to a transmission channel which is needed by active lines.

The last two entries in the table (FIG. 3) may be thought of as codes for indicating that a line is no longer waiting for service in a queue. The disconnect status code 101 is written in the connect queue location for a line which was waiting to be served when the line becomes inactive. Similarly, the serve status code 000 is written in the disconnect queue location for a line which was waiting to be disconnected when such a line becomes active before it is disconnected. Additionally, the appropriate one of these codes is entered in queue location for a line waiting for service when the line is connected or disconnected by the switching logic 12 (FIG. 1A).

Referring to FIG. 4, the contents of the queue store 10 (FIG. 2) is shown after the completion of a selected queuing operation. The code in queue store location M1, which is assigned to line L1 (FIG. 1A), is 001. Referring to FIG. 3, this code indicates that line L1 is in connect queue Q1 waiting to be connected to a transmission channel. The code 011 (FIG. 4) in store locations M2 and M3 indicates that lines L2 and L3 (FIG. 1A) are in queue Q2 waiting to be connected.

Location M4 (FIG. 4) of the queue store 10 (FIG. 2) contains the code 101. Referring to FIG. 3, the code 101 is described as the disconnect status. This code in location 4 (FIG. 4) indicates that line L4 is not waiting for service. In other words, the code indicates that line L4 is inactive and not connected to a transmission channel. An example of a situation giving rise to the generation of this code is where a line becomes active and is placed in a connect queue, and then becomes inactive before it receives a connection.

Locations M5 and M6 (FIG. 4) contain the codes 101 and 100, respectively. The presence of these codes in these locations indicates that lines L5 and L6 are inactive and waiting in a disconnect queue to be disconnected from a transmission channel. The code 010 in location M5 (FIG. 4) indicates that line L5 is in the disconnect queue Q1. Similarly, the code in location M6 (FIG. 4) indicates line L6 is waiting in the disconnect queue Q2.

The presence of the code 000 in location M*n* (FIG. 4) indicates that line L*n* is not waiting to be disconnected. This code is the service status code shown in FIG. 3. It serves a purpose analogous to that served by the disconnect status code used in conjunction with a connect queue. The presence of a service status code in a location of the queue store 10 (FIG. 2) indicates that the associated line is active and connected. A situation giving rise to the generation of this code is the case where a line is connected, becomes inactive and is placed in a disconnect queue, and there becomes active again before it can be disconnected.

In order to describe the operation of the queuing circuitry in FIG. 2, it will be assumed that during the queuing operation following the one represented by FIG. 4, the contents of the queue store 10 (FIG. 2) is changed as shown in FIG. 5.

Generally, FIG. 5 is assumed to represent the existence of the following input conditions at the time of the second queuing operation. Replacing the connect queue Q2 code 011 (FIG. 4) in locations M2 and m3 of the queue store 10 with codes 101 and 000 (FIG. 5) results from line L2 becoming inactive and line L3 obtaining the connection for which it has been waiting, respectively. This condition results in connect queue Q1 (FIG. 4) after the first queuing operation, is transferred to connect queue Q2 by replacing the code 001 for connect queue Q1 (FIG. 4) in location M1 with the code 011 for connect queue Q2 (FIG. 5). Replacing the 101 (FIG. 4) in location M4 with 001 (FIG. 5) indicates that line L4 has become active and is in connect queue Q1 waiting for a connection. It is further assumed that line L6, which was waiting to be disconnected in disconnect queue Q2, has been disconnected. This disconnection is reflected by changing the disconnect queue Q2 code 100 (FIG. 5). Additionally, since line L6 was the only line in disconnect queue Q2, its disconnection results in the queue Q2 being empty. Consequently, the line L5 entry 010 in location M5 (FIG. 4), indicating the line is in disconnect queue Q1, is changed to the code 100 (FIG. 5) to put it in disconnect queue Q2. The last line L*n* sampled in this queuing operation has a connection. However, it has become inactive and is waiting in disconnect queue Q1 to be disconnected. This is reflected by changing the serve code 000 (FIG. 4) in location M*n* to the disconnect queue Q1 code 010.

Referring to FIG. 2, the disconnect code generator 20 and serve code generator 22 are enabled by the signals D and S, respectively. These signals are generated between queuing operations by the switching logic 12 (FIG. 1A) when a line with an entry in a queue is connected or disconnected. For instance, when the switching logic 12 (FIG. 1A) connects a line with an entry in the connect queue Q2, it generates the signal S which results in the serve code generator 33 (FIG. 2) replacing the lines connect queue Q2 entry with the serve code (FIG. 3). In other words, when a line in the connect queue is connected, it is removed from the queue since it is no longer waiting for a connection. A specific example of this operation is represented by changing the code 011 (FIG. 4) in location M3 to 000 (FIG. 5) when line L3 is connected to a transmission channel.

The generation of the signal D by the switching logic 12 (FIG. 1A) upon disconnecting a line with an entry in a disconnect queue results in analogous operation by the disconnect code generator 20 (FIG. 2). An example of this operation is replacing the disconnect queue Q2 code 100 in location M6 (FIG. 4) with the disconnect code 101 (FIG. 5) when the line L6 is disconnected.

During a queuing operation, the circuitry in FIG. 2 operates in essentially the same manner as described above in discussing FIG. 1B. During the first scan of lines L1 through L*n* (FIG. 1), the circuitry deletes queue entries for lines which should no longer be in the queue and determines if either connect queue Q2 or disconnect queue Q2 is empty. Deletion of unneeded queue entries is accomplished by the disconnect code generator 20 and the serve code generator 33.

As the lines are scanned, each inactive line results in a TDNC output from the detector 5 (FIG. 1A). The TDNC signal is applied to the disconnect code generator 20 (FIG. 2) along with the code stored in the queue store 10 associated with the line, and the timing signal T1. The timing signal T1 remains true during the first scan of lines. When the signals TDNC and T1 are present, and the line being sampled has a connect queue code SCQn in its queue store location, the code generator 20 is activated. The activation of the code generator 20 results in the connect queue code of the sampled line being replaced with the disconnect status code SDC (FIG. 3). In other words, a line that became active in the past and was entered in a connect queue has since become inactive before obtaining a connection and the above operation removes it from the queue. A specific example of the foregoing is the changing of the connect queue Q3 code 011 in location M2 (FIG. 4) of the queue store 10 (FIG. 2) to 101 (FIG. 5) when the line L2 becomes inactive.

The operation of the serve code generator 33 (FIG. 2) is essentially the same as the disconnect code generator 20, the only difference being that the former generates the serve code SSC (FIG. 3) when a line sample results in the detector 5 (FIG. 1) generating the signal TNC and the line has a disconnect queue code in its associated queue store 10 (FIG. 2) location. The foregoing occurs when an inactive line with a connection is waiting to be disconnected and becomes active before the disconnection occurs. Essentially, the operation of the serve code generator 33 removes these lines from the disconnect queue.

In addition to the preceding, the contents of both the connect and the disconnect queues are checked during the first scan of the lines during the queuing operation. This is accomplished by four state detectors 21 through 24.

The contents of connect queue Q1 is checked by the CQ1 state detector 21 (FIG. 2). If the sampling of a line during T1 results in the detector 5 (FIG. 1) generating a TNC signal, and the line has a connect queue Q1 code in its associated storage location of the queue store 10 (FIG. 2), the detector 21 is enabled. Similarly, the connect queue Q2 contents are checked during T1 by the CQ2 state detector 22. In this case, the operation is the same as that described above except that the sampled line must have a connect queue Q2 code in its associated storage location in queue store 10 to enable the CQ2 detector 22.

The DQ1 state detector 23 (FIG. 2) checks the contents of disconnect queue Q1 and the DQ2 state detector 24 checks the contents of disconnect queue Q2 during time T1. The DQ1 detector 23 is enabled during T1 when a sampled line results in the detector 5 generating a TDNC signal and that line has a disconnect queue Q1 code in its queue store location. Similarly, the DQ2 state detector 24 is enabled during T1 when a sampled line results in a TDNC output from the detector 5 (FIG. 1) and the line has a disconnect queue code Q2 in its queue store location.

Once any one of the four detectors 21 through 24 discussed above are enabled during time T1, it remains enabled until the signal T0 is generated immediately prior to beginning a new queuing operation. The signal T0 occurs just before the occurrence of the signal T1 which represents the first scan of lines in a queuing operation. The presence of the signal T0 initializes the four detectors in preparation for the first scan of the queuing operation by disabling them. At the end of the first scan of the *n* lines, T1 is no longer present and none of the detectors can be set in the following two scans of the lines of the queuing operation.

More specifically, the CQ1 detector 21 (FIG. 2) is enabled during T1 when line L1 is sampled and the code in its assigned queue store location M1 is as shown in FIG. 4. It will be recalled that for this sampling it was assumed line L1 was active and consequently, the detector 5 (FIG. 1) will generate a TNC signal. This TNC signal, combined with T1 and the code 001 in location M1 of the queue store (FIG. 4) enables the CQ1 detector 21 (FIG. 2). Similarly, the DQ1 detector 23 will be enabled when inactive line L5, which has the disconnect queue Q1 code 010 in its location M5 (FIG. 4) of the queue store, is sampled during T1. Consequently, at the end of T1, the CQ1 detector 21 (FIG. 2) and the DQ1 detector 23 will be enabled. This indicates that both the connect queue Q1 and the disconnect queue Q1 contain entries.

The CQ2 detector 22 (FIG. 2) is not enabled during T1. Referring to FIG. 4 which represents the contents of the queue store immediately after the preceding queuing operation, it is seen that only lines 2 and 3 had queue Q2 codes in their respective queue store locations M2 and M3. However, it was assumed that line L3 obtained a connection and line L2 became inactive between the preceding queuing operation and the queuing operation currently being considered. When line L3 obtained a connection, the switching logic 12 (FIG. 1) generated the signal S which is applied to the serve code generator 33 (FIG. 2). The application of this signal resulted in the generator 33 replacing the queue Q2 code in the queue store location M3 (FIG. 4) with the serve status code 000. This change is reflected in the FIG. 5 representation of the queue store by the 000 entry in location 3. Consequently, the CQ2 detector 22 will not enabled during T1 because no TNC signal will be generated when inactive line L2 is sampled; and no connect queue Q2 code will be present when line L3 is sampled.

Similarly, the DQ2 detector 24 (FIG. 2) is not enabled during T1 since line 6, which had the disconnect queue Q2 code in its location M6 (FIG. 4), is assumed to have been disconnected by the time the current queuing operation begins. This disconnection of line L6 results in the disconnect queue Q2 code 100 in location M6 (FIG. 4) being replaced with the disconnect code 101 (FIG. 5). Consequently, when line L6 is sampled during T1, its queue entry is no longer the 100 code required to enable the detector DQ2 (FIG. 2).

As the second scan of the lines during the queuing operation begins, T2 becomes true while the CQ1 detector 21 (FIG. 2) and DQ1 detector 23 are enabled, indicating entries in connect queue Q1 and disconnect queue Q1. Additionally, CQ2 and DQ2 detectors 22 and 24 are not enabled, indicating that both the connect queue Q2 and disconnect queue Q2 are empty. The states of these detectors result in the generation of the signals CQ1, $\overline{CQ2}$, DQ1 and $\overline{DQ2}$.

Referring to FIG. 2, the code translators 27, 32, and the code generators 30, 31 can be enabled during T2. Since the condition CQ1$\cdot\overline{CQ2}\cdot$T2 exists, it is clear that the CQ1 to CQ2 code translator 29 will operate every time a line having a connect queue Q1 entry SCQ1 (FIG. 3) in its queue store location is encountered. In other words, connect queue Q1 entries are transferred into connect queue Q2 since the latter queue is empty. An example of the code translators operation is represented by the change in the connect queue Q1 code 001 (FIG. 4) in location M1 of the queue store to the connect Q2 code 011 (FIG. 5) when line L1 is sampled. This change transfers line L1 from connect queue Q1 to connect queue Q2.

The DQ1 to DQ2 code translator 32 is enabled when line L5 is sampled with the existing condition DQ1$\cdot\overline{DQ2}\cdot$T2. In this case, the entries in disconnect queue Q1 are transferred into the empty disconnect queue Q2. The result of enabling of the translator 32 is represented by the disconnect queue Q1 code 010 (FIG. 4) in location M5 of the queue store being changed to the disconnect queue Q2 code 100 (FIG. 5) when line L5 is sampled during T2.

The CQ1 code generator 30 is enabled when L4 is sampled during T2. It will be recalled that line L4 is assumed to be active at this time. Consequently, the detector 5 (FIG. 1A) will generate the signal TNC when line L4 is sampled. Referring to FIG. 4, the queue store location M4, associated with line L4, contains the SDC code 101, indicating that the line was inactive during the preceding queueing operation. Therefore, when line L4 is sampled, the condition TNC SDC T2 exists and the generator 30 enabled. This results in the SDC code 101 in queue store location M4 being replaced by the SCQ1 connect queue code 001 (FIG. 5). Essentially, this change in the code stored in location 4 of the queue store puts line L4 in connect queue Q1.

Similarly, when line L*n* is sampled during T2, the DQ1 code generator 31 will be enabled and generate the code SDQ1. It was assumed that at the beginning of the current queuing operation the line L*n* was inactive. Consequently, when the line is sampled, the output of the detector 5 (FIG. 1) will be the signal TDNC. At the same time the TDNC signal generated by the sampling of line L*n* is applied to the DQ1 code generator 31 (FIG. 2), the SSC code 000 (FIG. 4) in location M*n* of the queue store will also be present. The presence of the SSC code indicates that line L*n* is not in a disconnect queue. Since this sampling is occurring at time T2, the condition TDNC$\cdot$ SSC$\cdot$ T2 exists and the code generator 31 is enabled. The result of enabling the DQ1 code generator at this time is to change the SSC code 000 (FIG. 4) in location M*n* of the queue store to 010 (FIG. 5). This puts the inactive line L*n* in disconnect queue Q1.

It will be recalled that the connect queue Q2 and disconnect queue Q2 are the queues that are served when the switching logic disconnects or connects new lines to transmission channels. Consequently, during the time interval between the queuing operation resulting in the queues represented in FIG. 5 and the next queuing operation, the lines with disconnect queue Q2 and connect queue Q2 codes in their queue store locations, will be served. In other words, if any connections or disconnections are made by the switching logic 12 (FIG. 1) during this interval, they will be connections for these lines. In this case the lines are lines L1 and L5.

After the above operations have been completed, the connect queue Q2 only contains one entry represented by the code in location M1 (FIG. 5). Referring to FIG. 4, it will be seen that before the performance of the above operations, connect queue Q2 contained two entries represented by the codes in locations M2 and M3. In other words, the foregoing illustrates how queue length may vary as the inputs to a system vary even though the total number of storage locations available for queuing remain fixed. With *n* input lines and *n* queue store locations, each store location will contain one of the six codes shown in FIG. 3. The number of any particular code present in the store at a given time is a function of past and present inputs to the system.

CONCLUSION

While the foregoing has described the operation of applicant's invention in a TASI system, it is clear that the invention is useful in any system serving a plurality of inputs that vary in real time. For example, it is obvious that the invention could readily be used in a data processor that processes real time inputs from numerous input terminals. Additionally, it is clear that the invention could be adopted to queue actual data, rather than line addresses, without any major modification.

The invention may be summarized as a store, having the same number of storage locations as there are input lines, that is partitioned into a plurality of queue stores. The partitioning may be accomplished by physically partitioning sets of store locations or through the use of codes that identify the various queues. In operation, inputs in one queue are served while the other queues are queuing inputs unable to obtain service. When the served queue has been emptied, the contents of a selected one of the other queues may be transferred into the served queue or one of the other queues may become the served queue.

It is clear that the disclosed invention is of general applicability in the various fields involving the processing of real time signals and that numerous other uses and applications within the spirit and scope of the invention will be apparent to those skilled in the art.

I claim:

1. In combination:

storage means for storing a plurality of queues;
serving means for serving a selected queue stored in said storage means;
means for forming a first queue of input signals occurring on a set of input lines in said storage means when said storage means contains a second queue of input signals on said set of lines that is being served by said serving means;
a detector for detecting when all the constituents in said second queue have been served;
said serving means responsive to said detector for serving the constituents in said first queue; and
means for reconstituting said second queue as selected input signals occur on said set of lines while said first queue is being served.

2. The combination of claim 1 wherein said storage means has a number of discrete storage locations equal to the total number of lines in said set of input lines.

3. The combination of claim 2 further comprising:
means for associating each of said discrete storage locations with a line in said set of input lines; and
means periodically responsive to the signal on an input line and the contents of the storage location associated with said line for storing a selected code in said storage location.

4. In combination:
queuing means for forming a queue of selected input signals;
a storage means;
means for transferring said queue from said queuing means to said storage means when said storage means is empty; and
means responsive to a selected constituent of said queue in said storage means for processing one of said selected input signals.

5. The combination of claim 4 further comprising means for randomly selecting said constituent of said queue in said storage means.

6. In combination:
a first store;
a second store;
queuing means for forming a queue of selected input signals in said first store when said second store contains a queue;
serving means for selectively processing the input signals queued in said second store;
means for forming a new queue of selected input signals in said second store when all the inputs constituting said queue in said second store have been served; and
means for selectively processing the input signals queued in said first store while said new queue is being formed in said second store.

7. The combination of claim 6 further comprising:
a signal generator that generates a signal at random intervals after being enabled; and
means responsive to the random signal for controlling said serving means.

8. Circuitry for queuing input signals from a set of sources that occur when a real time system is operating at full capacity which comprises:
means for storing a plurality of input queues;
serving means for selecting a constituent in a selected queue when said system is capable of serving the input signals from another source;
means for deleting said constituent from said selected queue when said system serves the appropriate source;
means for scanning the storage means to determine when said selected queue is empty; and
means for changing the queue served by said serving means from the empty queue to a selected one of the remaining queues.

9. The circuitry of claim 8 wherein said means for storing a plurality of input queues further comprises:
means for associating each of said sources with a location in a storage means;
means periodically responsive to inputs from said sources and the contents of their respective store locations for storing selected codes in said store locations.

10. The circuitry of claim 9 wherein the means for associating each of said sources with a location in said storage means further comprises:
means for repetitively sampling a plurality of input lines at a fixed rate; and
a recirculating storage means that recirculates in synchronism with said sampling.

11. The circuitry of claim 9 wherein said means for deleting a queue constituent further comprises means responsive to signals generated by said system when the input signals from a source with a selected code in its respective store location are processed for altering said selected code.

12. The circuitry of claim 8 wherein the means for determining when said selected queue is empty further comprises:
means for accessing the contents of each location in said storage means; and
detection means for generating a selected signal until a store location containing a selected code is accessed.

13. The circuitry of claim 8 wherein the means for changing the served queue further comprises translation means for replacing a first code in an accessed storage location with a second code when said served queue is empty.